Jan. 27, 1959    E. R. KRETZMER    2,871,376
TEMPERATURE SENSITIVE TRANSISTOR CONTROL CIRCUIT
Filed Dec. 31, 1953    3 Sheets-Sheet 1
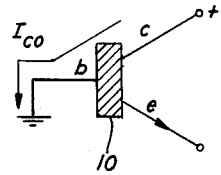
FIG. IA
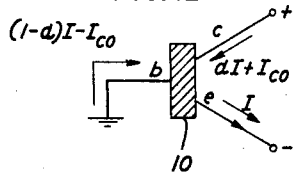
FIG. IB
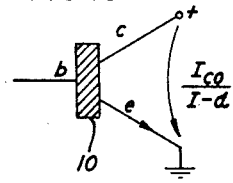
FIG. IC
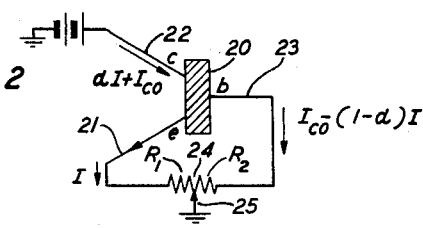
FIG. 2
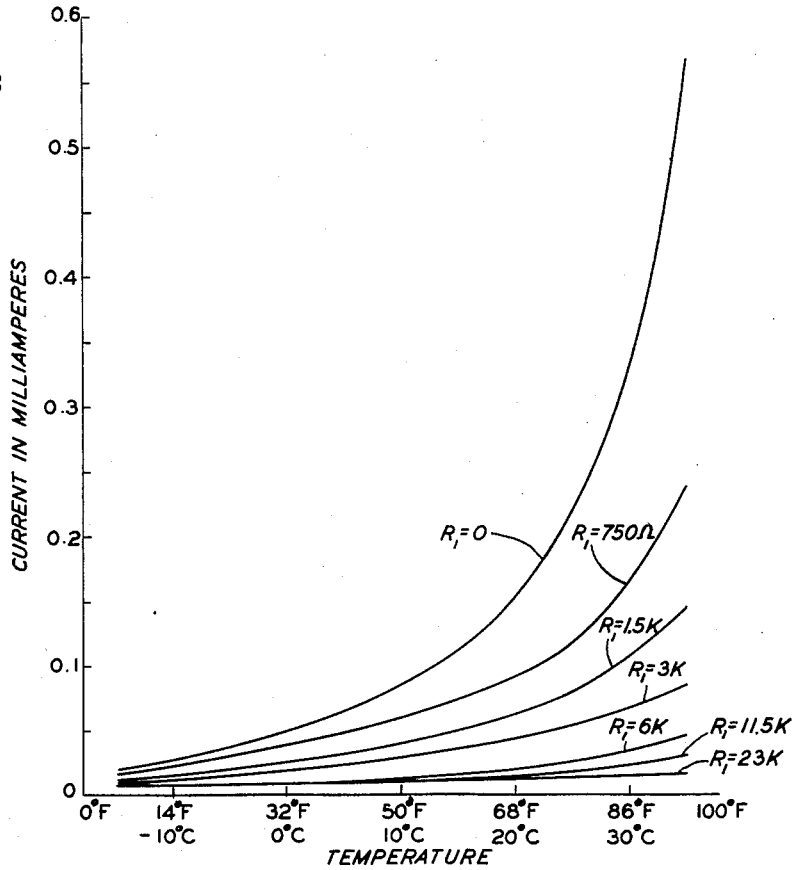
FIG. 3
INVENTOR
E. R. KRETZMER
BY
H. O. Wright
ATTORNEY Jan. 27, 1959   E. R. KRETZMER   2,871,376
TEMPERATURE SENSITIVE TRANSISTOR CONTROL CIRCUIT
Filed Dec. 31, 1953   3 Sheets-Sheet 2
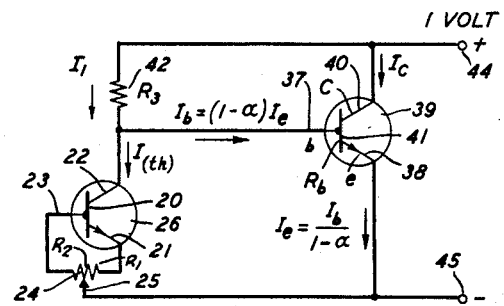
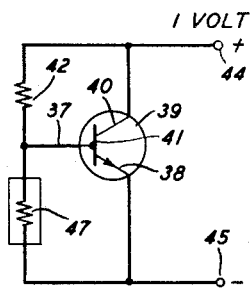
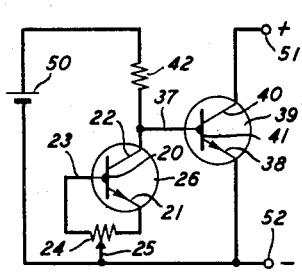
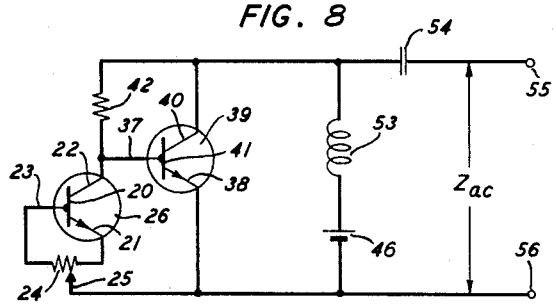
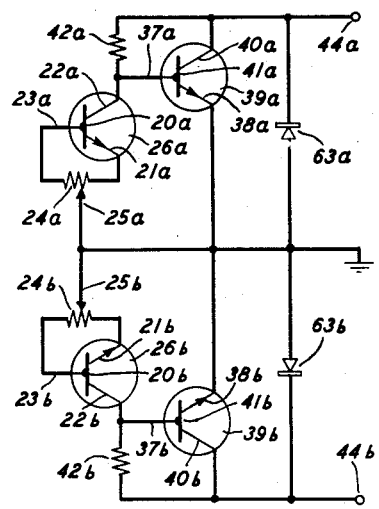
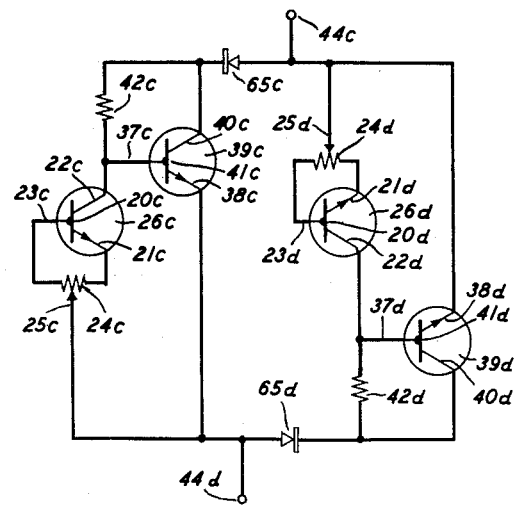
INVENTOR
E. R. KRETZMER
BY
H. O. Wright
ATTORNEY

THERMAL IMPEDANCE CHARACTERISTIC

United States Patent Office 2,871,376
Patented Jan. 27, 1959

2,871,376

TEMPERATURE SENSITIVE TRANSISTOR CONTROL CIRCUIT

Ernest R. Kretzmer, New Providence, N. J., assignor to Bell Telephone Laboratories, Incorporated, New York, N. Y., a corporation of New York Application December 31, 1953, Serial No. 401,598

12 Claims. (Cl. 307—88.5)

This invention relates in general to temperature sensitive control circuits and more particularly to circuits including transistors as their thermally sensitive elements.

Although thermistors and various other types of temperature sensitive control units are well-known in the prior art, most of these devices are characterized by negative temperature coefficients of resistance (positive coefficients of conductance), which may be distinctly disadvantageous for providing temperature control in certain circuit configurations.

Accordingly, it is a principal object of the present invention to provide a temperature sensitive control circuit characterized by a positive temperature coefficient of resistance.

A circuit devised in accordance with the present invention utilizes certain temperature variational characteristics of the transistor to provide a control current which varies as a negative function of temperature. A preferred embodiment of the invention comprises a circuit including a pair of transistors, one serving as the principal temperature control element, and the other serving to amplify and enhance the temperature variations of the first. Although the latter transistor will be referred to hereinafter as the "amplifying transistor" for ease of description in distinguishing from the principal temperature sensitive element, it functions, in addition as an amplifier, to actually enhance the temperature sensitivity of the circuit, in a manner which will be pointed out hereinafter.

So-called "junction transistors" referred to in the specification and claims hereinafter, are in general of the type described in an article entitled "The Theory of p-n Junctions in Semiconductors and p-n Junction Transistors" by W. Shockley in the Bell System Technical Journal, vol. 28, No. 3, July 1949, pages 435–489, and in a subsequent article entitled "Junction Transistors" by W. Shockley, M. Sparks and G. K. Teal in the Physical Review, vol. 83, No. 1, July 1951, pages 151–162.

When the collector-to-base junction of a junction transistor is biased in the reverse direction and the emitter is floated, such a transistor is characterized by a current flowing from the collector electrode into the base electrode which is strongly temperature sensitive. In accordance with the present invention, the temperature sensitive character of the collector current in such junction transistors is used to multiple advantage. Inasmuch as the resistance presented between the collector and emitter electrodes of the amplifying transistor depends on the current flowing into the base electrode, the current into the base electrode is in turn controlled by a thermally sensitive element connected between the emitter and base electrodes thereof. In preferred embodiment, this thermally sensitive element may comprise another transistor operated in a manner to be described presently.

In accordance with a preferred embodiment of the invention, current supplied from a potential source through a high resistance element divides between the base of the amplifying transistor and the thermally sensitive element. Thus, at high temperatures, since the thermally sensitive element has a low resistance, it draws most of the constant current from the source, leaving little flowing into the base electrode of the amplifying transistor. This, in turn, causes low emitter current and correspondingly high emitter resistance. At low temperatures, a major component of the current from the constant current source flows into the base electrode, causing a correspondingly high emitter current, and thereby reducing the emitter resistance. Thus, although the control current through the thermally sensitive element itself varies in a positive direction with changes in temperature, corresponding variations are produced in the emitter conductance which are related negatively to changes in temperature and thus further enhance the changes in base current. Accordingly, the resulting variations in emitter and collector currents are similarly enhanced and therefore a resistance having a large positive temperature coefficient is presented between the collector and emitter of the amplifying transistor.

Although a conventional thermistor may be used for the temperature sensitive element described in the foregoing paragraphs, in preferred form, this element comprises a transistor which may be of the general type described in the publications previously cited.

If the emitter and base electrodes of a properly biased junction transistor are connected together through a potential divider with a slidable tap, an adjustable, highly temperature sensitive resistance appears between the collector terminal and the tap. The available output current through these terminals is gradually increased to a maximum as the slider is moved from base to emitter electrodes.

Moreover, it has been found that certain types of transistors, which have been rejected as having too large a flow of current into the collector-base junction for amplification purposes, are particularly applicable for use as temperature sensitive units in accordance with the teachings of the present invention.

It is accordingly an additional object of the present invention to utilize certain types of transistor rejects as temperature sensitive elements.

It will be apparent from a detailed study of the specification hereinafter, that a variety of modifications of the present invention are possible. For example, in accordance with one of the embodiments disclosed, constant current is furnished to the thermally sensitive element and the base electrode of the amplifying transistor separately from signal current, so that a current flows between the emitter and collector terminals of the amplifying transistor which is independent of the applied voltage, but decreases with rising temperature.

Although the embodiments mentioned in the foregoing paragraphs are adaptable principally for direct current temperature-control applications, modified forms are disclosed which are particularly adaptable for temperature control of alternating current signals. In an embodiment particularly adapted for small signal alternating current, the direct current transistor biasing circuit is isolated from the alternating current signal circuit by a blocking condenser connected to the collector terminals, and correspondingly, alternating current is substantially eliminated from the direct current biasing circuit by inclusion therein of an element having high alternating current impedance and low direct current resistance.

Other circuit configurations disclosed are particularly adapted for large signal alternating current. These include back-to-back series, and alternatively, parallel arrangements of thermally sensitive control circuits in accordance with the present invention, to take care of the positive and negative alternating current components.

Additional objects, features and advantages of the present invention will be apparent from a detailed study of the specification hereinafter with particular reference to the attached drawings, in which:

Figs. 1A, 1B and 1C are schematic showings employed in the explanations of the theory of the present invention;

Fig. 2 is a schematic showing of a preferred form of thermally sensitive element in accordance with the present invention;

Fig. 3 is a family of curves showing current-temperature characteristics for the circuit of Fig. 2 for five different values of resistance in the emitter-base circuit.

Fig. 4 shows a preferred circuit arrangement in accordance with the present invention for direct current applications, utilizing two transistors, one of which operates as the principal thermally sensitive element and the other of which functions to amplify and enhance the temperature variations of the first.

Fig. 6 shows a modification of the circuit of Fig. 4 in which a conventional thermistor is substituted for the thermally sensitive transistor unit of the latter;

Fig. 7 shows a modification of a circuit of Fig. 4 in which the current output is independent of the applied voltage but decreases with rising temperature;

Fig. 8 is a variation of the circuit Fig. 4 especially adapted for small signal alternating current variations; and Figs. 9 and 10 are back-to-back circuit arrangements in accordance with the present invention, in series and parallel, respectively, which are especially adapted for large signal alternating current.

Figure 5:
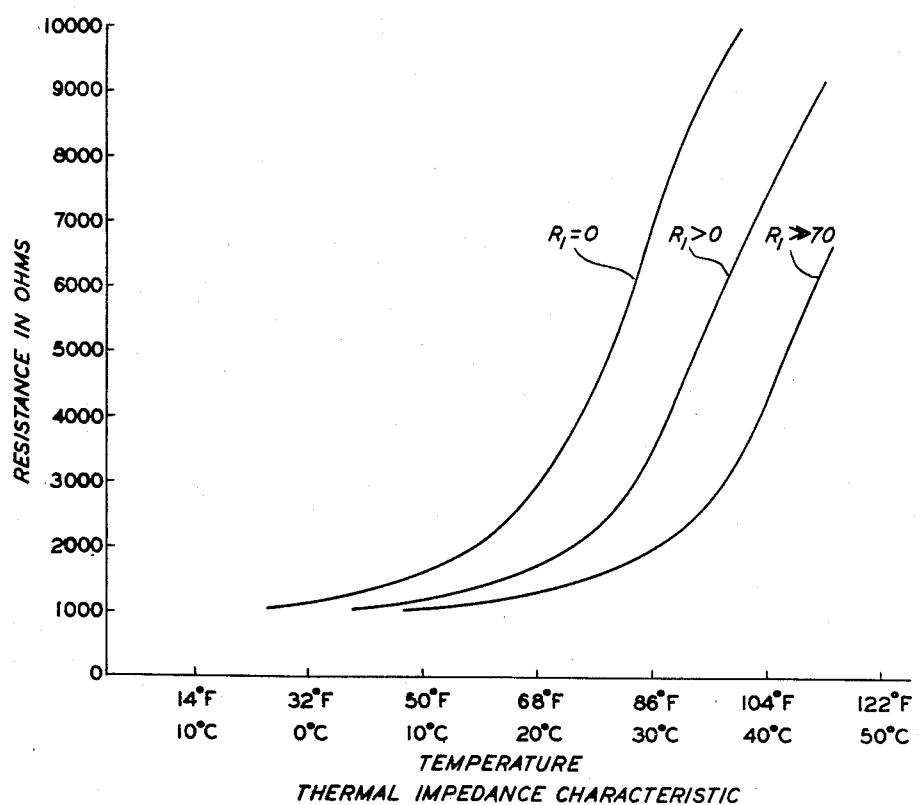
Fig. 5 is a family of curves showing the variations in impedance with temperature presented across the terminals 44 and 45 of the circuit of Fig. 4.

It is well known that certain types of semiconductor junctions when biased in a non-conducting direction, pass a current which is exceedingly temperature dependent. This so-called "saturation current" is substantially independent of applied voltage. In certain types of junction transistors, such as described in the publications cited, this saturation current doubles with every 8° C. temperature rise. Fig. 1A shows a semiconductor junction 10 of the type described, comprising n-p-n germanium, in contact with which is an emitter electrode $e$, a base electrode $b$, and a collector electrode $c$. In practice, a sizable leakage current may flow in addition to the saturation current, the latter component being less temperature sensitive and rising with applied voltage.

In junction transistors, the saturation current is generally known as $I_{co}$ as indicated in Fig. 1A of the drawings, and is the only current (neglecting leakage) which flows when the collector is biased in a direction reverse to easy current flow, and the emitter is floated. Assuming the junction comprises an n-p-n combination of germanium and, as indicated in Fig. 1B, that a current I is drawn out of the emitter, a current $\alpha I + I_{co}$ will flow in the collector lead, giving a base current $(1-\alpha)I - I_{co}$, where $\alpha$ represents the current gain factor of the transistor.

Assuming, as indicated in Fig. 1C, that the base is floated, the base current becomes zero, giving $$(1-\alpha)I - I_{co} = 0$$

or $$I = \frac{I_{co}}{1-\alpha}$$

Thus, it is apparent that the effect of the saturation current $I_{co}$ is enhanced by transistor amplification. A typical unit might have the following parameters:

$I_{co} = 10$ microamperes $\alpha = 0.95$ $\dfrac{I_{co}}{1-\alpha} = 200$ microamperes The latter current may be even more temperature dependent than $I_{co}$, since $\alpha$ also tends to rise with temperature in certain types of transistors.

The foregoing discussion shows that either a small or relatively large temperature sensitive current can be obtained by floating the emitter or the base electrodes respectively. The small current may vary anywhere from roughly 1 to 100 microamperes, if one includes transistor units rejected because of excessive saturation current $I_{co}$. The large current may vary anywhere from, say, 20 microamperes to 2 milliamperes, assuming that the appropriate voltage is applied between the collector and the remaining electrode in each case. It will be apparent to those skilled in the art that if p-n-p junctions are used instead of the n-p-n type indicated, the polarities are appropriately reversed.

Referring now to Fig. 2 of the drawings, a junction transistor of the type described in the publications cited hereinbefore comprises a semiconducting body 20 which may, for the purposes of the present invention, be an n-p-n combination of germanium. The body 20 has affixed thereto an emitter electrode 21, a collector electrode 22 respectively making contact with the two separated layers of n-type germanium and the base electrode 23, contacting the junction layer of p-type germanium. The emitter and the base electrodes 21 and 23 are connected to the terminals of a 20,000-ohm resistance element 24, with which the grounded element 25 makes slidable contact. The positive terminal of a three-volt potential source 19 is connected to bias the collector 22. It is apparent that the circuit indicated in Fig. 2 makes available either small or large current I or any intermediate value thereof, flowing between the collector 22 and ground 25 depending on the placement of the potentiometer slider 25. When the latter is adjacent the base 23, the current is slightly (for example, 10 to 20 percent) lower than $$\frac{I_{co}}{1-\alpha}$$

As resistance $R_1$ is introduced between the emitter and ground the current rapidly decreases. For illustrative example, the resistance of the potential divider 24 $(R_1+R_2)$ has been given a value of 20,000 ohms, which is small enough to maintain full temperature sensitivity in all intermediate positions, and is large enough to permit a maximum current not far below $$\frac{I_{co}}{1-\alpha}$$

Fig. 3 of the drawings shows a family of curves indicating typical current-temperature performance of a transistor circuit of the type indicated in Fig. 2. The curves, in which current in milliamperes is plotted against temperature in both degrees Fahrenheit and degrees centigrade, are plotted for five different resistance positions of the slider 25 on the potential divider 24.

Although by way of specific example, the circuit of Fig. 2 has been described as utilizing junction transistors, the teachings of the present invention may be applied to any other types of transistors having a saturation current $I_{co}$ which varies significantly with temperature.

Fig. 4 of the drawings shows schematically a circuit which makes use of certain of the unique characteristics described with reference to the circuit of Fig. 2, in combination with certain enhanced characteristics due to the presence of an additional junction transistor connected in amplifying circuit relation therewith.

The circuit of Fig. 4 includes the thermally sensitive element described with reference to Fig. 2, which comprises a junction transistor 26 comprising a semiconductor body 20 having in contact therewith a collector 22, an emitter 21, and a base 23, the latter two electrodes connected to opposite terminals of a potential divider 24 having the adjustable tap 25. This entire combination, which will be designated hereinafter as a thermally sensitive element, is connected between the base electrode 37 and the emitter electrode 38 of a second transistor unit 39, also of the junction type described in the publications cited hereinbefore, comprising an n-p-n combination of germanium 41.

The collector 40 of the transistor 39 is biased one volt positively through a biasing source which is included in the external circuitry, or may be connected in series with the terminal 44. A 45,000-ohm resistance 42 ($R_3$) is connected between the collector 40 and the junction between the base 37 of the transistor 39 and the collector 22 of the thermally sensitive transistor element 26. The latter is substantially identical in form and characteristic with the thermally sensitive transistor element described in detail with reference to Fig. 2 of the drawings, the corresponding components thereof being identified by corresponding numerals. The slider 25 is connected from some point on the potential divider 24, between the emitter 21 and base 23 of the transistor 26 to the negative terminal 45, the direct current biasing path being completed through the external circuit including a one-volt source, the positive terminal of which is connected to terminal 44. It is apparent that the resistance presented across the terminals 44 and 45, respectively, to the collector 40 and the emitter 38 of the transistor 39, is a function of the current flowing into the base 37, which, in turn, is controlled by current through the thermally sensitive transistor element 26, the operation of which has been described in detail with reference to Fig. 2. The following definite parameter values have been assumed for the sake of illustration, but it will be apparent to those skilled in the art that these could be varied over wide ranges depending on the application of the circuit.

As indicated on Fig. 4, referring to the transistor 39, $I_b$ = (the current into the base) = $(1-\alpha)I_e$
$I_c$ = collector current $$I_e = (\text{emitter current}) = \frac{I_b}{1-\alpha}$$

$I_1$ = current into the divided circuit between base and thermally sensitive element
$I_{th}$ = current through the thermally sensitive element
$\alpha$ = (the current amplification factor of the transistor)

$$= \frac{I_c - I_{co}}{I_e}$$

$R_b$ = resistance seen when looking into base electrode

*Typical circuit values*

$\alpha = .98$
$r_b$ = (the incremental base resistance) = $500\omega$, where "incremental" resistance means the ratio of an increment of applied potential to an increment of current
$r_e$ (the incremental emitter resistance)

$$= \frac{25}{I_e}\omega$$

where $I_e$ is in milliamperes
$R_b$ (the incremental external base resistance)

$$= r_b + \frac{r_e}{1-\alpha}$$

$$= r_b + \frac{25}{(1-\alpha)I_e} = r_b + \frac{25}{I_b}$$

$I_{co}$ = 6 microamperes (warm). $R_{th}$ = 1000 ohms (warm)
$I_{co}$ = 0.6 microampere (cold). $R_{th}$ = 10,000 ohms (cold)
$L_1$ = 22 microamperes (substantially constant)
$R_3(42)$ = 45,000 ohms
Bias voltage = 1 volt In the present illustrative embodiment, it is seen that the constant current of 22 milliamperes which is supplied from the one-volt biasing source through the resistance element 42 divides between the base 37 and the thermally sensitive transistor element 26. At high temperatures, it is apparent that the thermally sensitive element 26 has a low resistance and, accordingly, draws most of the 22 microamperes, leaving little for the base 37, which, in turn, causes low emitter current and high emitter resistance. At low temperatures, the thermally sensitive element 26 has a high resistance allowing more current to flow to the base 37, which, in turn, lowers the effective emitter resistance until a stable equilibrium is reached. The larger part of the 22 microampere current then flows into the base 37, causing a relatively low resistance between the collector 40 and the emitter 38.

Resulting operation of the present illustrative embodiment can best be summarized in terms of percentage changes in emitter current, that is, collector-to-emitter direct-current resistance, in response to known small percentage changes in the resistance of the thermally sensitive transistor unit 26. For example, when the sum of $I_1+I_{co}$ slightly exceeds 26 microamperes and the resistance of the thermally sensitive element 26 approximates 5000 ohms, the emitter current is 500 microamperes. A 10 percent drop in the resistance of the thermally sensitive element 26 causes a drop of approximately 10 percent in the current of emitter 38. Higher sensitivities are obtainable by raising the value of $I_1$, that is, current from the source 44, and reducing the resistance of the thermally sensitive control element 26. For example, a change of almost 20 percent in the current of the emitter 38 is obtainable if the sum $I_1+I_{co}$ approximates 100 microamperes, and resistance of the thermally sensitive element 26 approximates 1000 ohms. This assumes that the resistance of the thermally sensitive element 26 is changed by only 10 percent. In this case it is apparent that the change produced by the thermally sensitive element 26 is enhanced by a factor of almost 2. Larger enhancement factors are obtainable if the value of $I_1$ is raised further and the resistance of the thermally sensitive element 26 is correspondingly decreased.

A family of typical curves showing the impedance variations with temperature across the terminals 44 and 45 of Fig. 4, for different settings of the potentiometer slider 25, is shown in Fig. 5. The first of these curves is plotted from data taken with the slider 25 directly connected to emitter 21, so that $R_1=0$; the second curve, with the slider 25 connected at an intervening point, so that the value of $R_1$ is substantially greater than zero, and the third, with the slider 25 connected directly to the base 23, so that the value of $R_1$ is very large.

Although, the present embodiment includes a transistor element of the type described with reference to Fig. 2, as its thermally sensitive element, it will be apparent that a thermistor device of any of the types well-known in the art having an appreciable predictable temperature-current variation can be substituted therefor. This is indicated in Fig. 6 of the drawings which is similar to the circuit of Fig. 4, with the exception that it includes the thermistor device 47 connected between the base 37 and the emitter 38 of the transistor 39. The other elements of the circuit are substantially similar to those disclosed in the arrangement of Fig. 4 and the operation is substantially the same except for the difference in control action derived from the use of the thermally sensitive transistor element 26 in the latter circuit. It will be apparent that a similar modification can be made in any of the circuits to be described hereinafter.

Referring to the circuits shown in Figs. 4 and 6, it will be noted that if the applied voltage is doubled, the current through the resistance element 42 is also doubled. Because of the emitter resistance dependence upon current, the base current (and hence the emitter current) will more than double. Hence, the current division changes with increased applied voltage and this, in turn, causes the collector to emitter resistances to drop. This effect can be reduced, at the expense of temperature sensitivity, by providing an external emitter resistance which is large compared with the value of the emitter resistance $r_e$.

Referring now to Fig. 7 of the drawings, there is shown a circuit in which the current output decreases with rising temperature, but is, in addition, independent of the applied voltage at terminal 51. This is due to the fact that the upper terminal of the resistance 42 instead of being returned to the collector 40 as indicated in the circuits of Figs. 4 and 5 is returned to a separate fixed voltage point, as indicated by the positive terminal of the source 50. Accordingly, it is apparent that the current flowing between the terminals 51 and 52 which are respectively connected to the emitter 38 and the collector 40, while varying as a negative function of temperature, will be essentially independent of the applied voltage at terminal 51 so long as the resistance of collector 40 is high.

Although the devices described with reference to Figs. 4, 6 and 7 are primarily arranged for direct-current applications, certain slight modifications will adapt these circuits for alternating current operation.

Referring in detail to Fig. 8 of the drawings, there is shown a circuit in accordance with this invention which is particularly modified for small signal alternating current operation, when no direct current transmission is required. Such operation is attained by supplying the direct current voltage from the source 46 through a choke 53 or other device of high incremental alternating current impedance and low direct current resistance. A capacitor 54 is connected between the terminal 55 and collector 40 in series with the signal source to prevent application of direct voltage from the source 46 to external circuitry. The other elements of the circuit of Figs. 8 are substantially similar to those indicated with reference to Figs. 4 and 6, and the general operation of the circuit is in accordance with the principles hereinbefore set forth.

Fig. 9 of the drawings shows a circuit particularly adapted for large signal alternating current operation which includes two oppositely-poled circuits of the type described with reference to Fig. 4, in a back-to-back arrangement. Referring in detail to Fig. 9, thermally sensitive transistor elements 26a and 26b having, respectively, emitters 21a and 21b, collectors 22a and 22b, and base electrodes 23a and 23b, are similar in structure and operation to the thermally sensitive transistor circuit 26 described in detail with reference to Fig. 2.

The emitters of transistors 26a and 26b are connected to their bases through respective potential dividers 24a and 24b, the grounded taps 25a, 25b being positioned in each case to provide a desired operating point for each of the transistors 26a and 26b. The collectors 22a and 22b of the latter are respectively connected to the bases 37a and 37b of transistors 39a and 39b, which are substantially similar in structure and operation to transistor 39, described with reference to previous figures.

The emitters 38a, 38b of amplifying transistors 39a, 39b are also connected to a common ground. As in previously described circuits, resistance elements 42a and 42b are connected from the junction of the respective base electrodes 37a, 37b with the thermally sensitive elements 26a, 26b to the respective collectors 40a, 40b. Rectifiers 63a and 63b are arranged, back-to-back, between ground and the respective collector terminals of transistors 39a and 39b, so that when an alternating current is applied across the terminals 44a and 44b, each half of the circuit operates during one part of the cycle, the other half being shorted out. Operating bias for the transistors is provided by the signal current.

Another circuit arrangement giving similar performance for large signal alternating current is shown in Fig. 10 of the drawings. This is parallel arrangement of two circuit units substantially similar to the circuit described with reference to Fig. 4 of the drawings.

Thermally sensitive transistor units 26c and 26d are connected between the bases 37c and 37d, and the emitters 38c and 38d through rectifiers 65c and 65d, which are so selected as to establish a desired operating point on the temperature-current scale. The emitters 21c and 21d are connected to opposing terminals 44d and 44c, respectively. As in the circuits previously described, the collectors 40c and 40d are connected to the respective base electrodes 37c and 37d through large resistors 42c and 42d. Collectors 40c and 40d are respectively connected to the terminals 44c and 44d through oppositely directed rectifiers, 65c and 65d, so that when alternating current signals are applied across the aforesaid terminals during part of the cycle one-half of the circuit is operative, and the other is open-circuited. As in the previously described circuit, the signals provide operating bias for the transistors. In both circuits, external emitter resistors may be added as previously described with reference to Figs. 4 and 6 to improve the linearity, at the expense of temperature sensitivity.

Although a number of circuits have been described herein by way of illustration it is apparent that there are many other possible modifications of the basic configuration described. For example, in Fig. 3 and in any of the other figures, the positions of the resistance 42 and the thermally sensitive element 26 may be interchanged, giving a negative but still amplified resistance-temperature coefficient. It is apparent that in any of the circuits the thermally sensitive elements, of the type described in detail with reference to Fig. 2 of the drawings, may be used interchangeably with thermistors of any of the types well-known in the art, which by exerting control action, give a desired impedance behavior between the collector and emitter terminals of the amplifying transistor. In addition, it will be apparent that control signals may be applied to the transistors, for example, in the circuit of Fig. 4, through the resistance element 42 or across some other suitable impedance, thus exerting independent control action. Moreover, resistor 42 in Fig. 4, may be replaced by another complete circuit such as shown in Fig. 4, so that the effects of the two circuits are multiplied.

It is also apparent that any of the circuits can be modified to accommodate junction transistors of opposite polarities than those shown, or other types of transistors, with appropriate changes in the circuit arrangements.

What is claimed is:

1. A two-terminal control circuit having a positive temperature coefficient of resistance which comprises in combination a transistor element comprising a semiconductor body, an emitter electrode, a collector electrode, and a base electrode, all in contact with said semiconductor body, a common connecting point connected to said base electrode, a thermally sensitive resistance element having a negative temperature coefficient of resistance connected between said common connecting point and said emitter electrode, and a source of direct, substantially constant current connected to said common connecting point between said base electrode and said thermally sensitive element to furnish current into said common connecting point which is separated into two components, said source having a polarity such that one of said current components flows through said constant conductance path into said base electrode in a direction to enhance the flow of current carriers between the emitter and collector electrodes in said transistor, and the remaining one of said current components flows into said thermally sensitive element, the sole means for externally connecting to said control circuit consisting of a pair of terminals connected between said emitter and collector electrodes, whereby a resistance having a positive temperature coefficient is realized across said terminals.

2. A combination in accordance with claim 1 wherein said thermally sensitive resistance element comprises a thermally sensitive transistor including a semiconductor body, an emitter electrode, a collector electrode, and a base electrode in operative contact with said body, said transistor including a high thermally sensitive saturation current, the emitter and base electrodes thereof connected together through a potential divider wherein the base of said first-named transistor is connected to the collector of said thermally sensitive transistor, and the emitter of said first-named transistor is connected to a position on said potential divider.

3. A two-terminal control circuit having a positive temperature coefficient of resistance which comprises in combination a transistor element comprising a semiconductor body, an emitter electrode, a collector electrode, and a base electrode, all in contact with said semiconductor body, a common connecting point connected to said base electrode, a thermally sensitive resistance element having a negative temperature coefficient of resistance connected between said common connecting point and a remaining one of said electrodes, and a source of direct, substantially constant current connected to said common connecting point between said base electrode and said thermally sensitive element to furnish current in said common connecting point which is separated into two components, said source having a polarity such that one of said current components flows through said constant conductance path into said base electrode in a direction to enhance the flow of current carriers between the emitter and collector electrodes in said transistor, and the remaining one of said current components flows into said thermally sensitive element, the sole means for externally connecting to said control circuit consisting of a pair of terminals connected between said emitter and collector electrodes, whereby a resistance having a positive temperature coefficient is realized across said terminals.

4. A two-terminal control circuit having a positive temperature coefficient of resistance which comprises in combination a transistor element comprising a body including a junction of semiconductor materials of opposite conductivity types, said transistor including an emitter electrode and a collector electrode connected on opposite sides of said junction, and a base electrode connected to said junction directly, a thermally sensitive resistance element connected between said base electrode and said emitter electrode, means for operatively biasing the emitter and collector electrodes of said transistor element, a direct current source, and an element having a direct current resistance which is at least several times larger than the maximum useful resistance of said thermally sensitive element connected between said collector and base electrodes in series with said source for supplying a substantially constant current to the common connecting point between said base electrode and said thermally sensitive element whereby said current is divided into two components, said source having a polarity such that a first said component flows into said base electrode in a direction to enhance the flow of current carriers between the emitter and collector electrodes in said transistor, and the second said component flows into said thermally sensitive element, the sole means for externally connecting to said control circuit consisting of a pair of terminals connected between said emitter and collector electrodes, whereby a resistance having an enhanced coefficient of temperature is realized across said terminals.

5. A two-terminal control circuit having a positive temperature coefficient of resistance, which comprises in combination a transistor element comprising a body including a junction of semiconductor materials of opposite conductivity types, said transistor including an emitter electrode and a collector electrode connected on oppoite sides of said junction, and a base electrode connected to said junction directly, a thermally sensitive resistance element characterized by a negative temperature coefficient of resistance connected between said base electrode and said emitter electrode, the sole means of externally connecting to said circuit consisting of a pair of signal terminals connected between said emitter electrode and said collector electrode, a substantially constant direct current source, connected independently of said signal terminals, from a first common connecting point between said base electrode and one terminal of said thermally sensitive element to a second common connecting point between said emitter electrode and the other terminal of said thermally sensitive element, current from said source into said first common connecting point separating into two components, a first component of said current directed to flow into said base electrode, and the second component of said current directed to flow into said thermally sensitive resistance element, whereby a resistance having a positive temperature coefficient which is independent of the applied signal voltage appears across said signal terminals.

6. A combination in accordance with claim 5 wherein said thermally sensitive resistance element comprises a thermally sensitive transistor including a semiconductor body, an emitter electrode, a collector electrode, and a base electrode in operative contact wtih said body, said transistor including a high thermally sensitive saturation current, the emitter and base electrodes thereof connected together through a potential divider wherein the base of said first-named transistor is connected to the collector of said thermally sensitive transistor element, and the emitter of said first-named transistor is connected to a position on said potential divider.

7. A two-terminal circuit having a high positive temperature coefficient of resistance which comprises in combination a pair of transistors, each having an emitter, a collector, a base, and a semiconducting body in contact with said electrodes, a potentiometer, a first one of said transistors characterized by a high thermally sensitive saturation current, said transistor having its collector connected to the base of said second transistor and its emitter and base electrodes connected across said potentiometer, a slidably adjustable contact connecting said potentiometer to the emitter of said second transistor, direct current biasing means connected to bias the emitters of said transistors at one polarity, and the collectors of said transistors at another polarity, and to supply a substantially constant direct current to the common connecting point between the base electrode of said second transistor and the collector electrode of said first transistor, said current separating into two components, and so directed that one of said components flows into the base electrode of said first transistor in a sense to increase the flow of current carriers between said emitter and base electrodes, and the other of said components flows into the emitter of said second transistor and input-output terminals for signal current connected between the collector and emitter electrodes of said second transistor.

8. A two-terminal control circuit having a positive temperature coefficient of resistance which comprises in combination a transistor element comprising a first body including a junction of semiconductor materials of opposite conductivity types, said transistor including an emitter electrode and a collector electrode connected on opposite sides of said junction and a base electrode connected to said junction directly, a thermally sensitive element comprising a second body including a junction of semiconductor material of opposite conductivity types, said element including a pair of electrodes, at least one making contact on one side of said junction and the other making direct contact with said junction, said thermally sensitive element characterized by a high thermally sensitive saturation current, said one contact of said thermally sensitive element connected to the base electrode of said transistor, and the other said contact of said thermally sensitive element connected to the emitter electrode of said transistor, a direct, constant current source connected to the common connecting point between said base electrode and said one contact, and adapted to furnish current to said point which separates into two components, first component of said current flowing into said base electrode in a direction to increase the flow of current carriers between said emitter and collector electrodes and the second component of said current flowing into said thermally sensitive element, the sole external connection to said circuit consisting of a pair of terminals connected between the emitter and collector electrodes of said transistor and including in series therewith an element having relatively low alternating current impedance and substantially infinite direct current resistance, whereby a resistance having a positive temperature coefficient is presented across said terminals for small signal alternating currents.

9. A two-terminal control circuit having a positive temperature coefficient of resistance for large signal alternating currents which comprises in combination a pair of transistor elements, each comprising a junction of semiconductor materials of opposite conductivity types, an emitter electrode and a collector electrode connected on opposite sides of said junction and a base electrode connected to said junction directly, a pair of thermally sensitive resistance elements comprising respectively a third and a fourth junction of semiconductor materials of opposite conductivity types, each of said elements including a pair of electrodes, at least a first one of each pair of said electrodes making contact on one side of its respective junction and a second one of each pair making direct contact with the respective junction, each of said elements characterized by a high thermally sensitive saturation current, the first of said contacts of each of said thermally sensitive elements respectively connected to each of the base electrodes of said transistors, and the said second contacts of each of said thermally sensitive elements connected to the emitter electrodes of said transistors, said emitter electrodes being connected together to a common ground point, each of the collector electrodes of said transistors connected to each of the base electrodes thereof through a respective one of a pair of elements having resistances which are large compared to the maximum useful resistance of each of said thermally sensitive elements, the sole external connections to said circuit consisting of a positive signal terminal and a negative signal terminal respectively connected to said collector electrodes, and a pair of rectifiers connected back to back between each of said respective terminals and said common ground point, whereby when a large signal alternating current is connected across said terminals one of said transistors is operative and one of said transistors is shorted out during each half of the cycle.

10. A combination in accordance with claim 9 wherein each of said thermally sensitive resistance elements comprises a third and a fourth transistor including at least two contacts on opposite sides of each said third and fourth junctions, said contacts designated as the emitter and collector electrodes, and a direct contact to each said junction designated as a base electrode, said last-name emitter and base electrodes in each of said third and fourth transistors being connected together through a potential divider, the base electrodes of said first and second transistors being respectively connected to the collector electrodes of said thermally sensitive third and fourth transistors and the emitter electrodes of said first and second transistors being connected to corresponding positions on said potential divider.

11. A combination in accordance with claim 10 wherein each of said thermally sensitive resistance elements comprises a transistor, each said transistor including a pair of contacts designated as emitter and collector electrodes, and a third contact designated as base electrode, said last-named emitter and base electrodes connected together in each said last-named transistors through a potential divider, wherein the base electrodes of said first-named transistors are respectively connected to the collector electrodes of said thermally sensitive transistors and the emitter electrodes of said first-named transistors are respectively connected to corresponding positions on said corresponding potential dividers.

12. A two-terminal control circuit having a large temperature coefficient of resistance for large signal alternating currents which comprises in combination a pair of transistor elements each comprising a junction of semiconductor materials of opposite conductivity types, emitter and collector electrodes connected on opposite sides of each said junction, and a base electrode connected to each said junction directly, a pair of thermally sensitive elements each comprising a body including a junction of semiconductor materials of opposite conductivity types, each said element including a pair of electrodes at least one of which makes contact on one side of the respective junction, and the other of which makes direct contact with the respective junction, each said element characterized by high thermally sensitive saturation current, said one contact connected to the respective base electrode of each said transistor, and said other contact connected to the emitter electrode of each said transistor, each of the collector electrodes of said transistors connected to each of the base electrodes thereof through a respective one of a pair of elements each having a resistance which is large compared to the maximum useful resistance of the respective thermally sensitive element, the sole external connections to said circuit consisting of a positive signal terminal and a negative signal terminal, a pair of current rectifiers, each of said signal terminals connected to the emitter of a respectively different one of said transistors and to the collector of the other of said transistors through a current rectifier, said current rectifiers being oppositely directed, whereby when a large signal alternating current is connected across said terminals one of said transistors is conducting and the other of said transistors is open-circuited during each half of the cycle.

References Cited in the file of this patent

UNITED STATES PATENTS

| | | |
|---|---|---|
| 2,579,336 | Rack | Dec. 18, 1951 |
| 2,585,077 | Barney | Feb. 12, 1952 |
| 2,604,496 | Hunter | July 22, 1952 |
| 2,693,568 | Chase | Nov. 2, 1954 |
| 2,693,572 | Chase | Nov. 2, 1954 |
| 2,696,739 | Endres | Dec. 14, 1954 |
| 2,757,243 | Thomas | July 31, 1956 |
| 2,802,071 | Lin | Aug. 6, 1957 |
| 2,808,471 | Pricel et al. | Oct. 1, 1957 |

OTHER REFERENCES

Shea: Principles of Transistor Circuits, pp. 164 to 179, John Wiley & Sons, Inc., New York, New York, Sept. 15, 1953.